United States Patent
Borman et al.

(10) Patent No.: US 6,226,655 B1
(45) Date of Patent: *May 1, 2001

(54) METHOD AND APPARATUS FOR RETRIEVING DATA FROM A NETWORK USING LINKED LOCATION IDENTIFIERS

(75) Inventors: Gilbert Borman, Bloomfield Hills, MI (US); Rajat Bhatnagar; Arul Sebastian, both of Stamford, CT (US); Anup Mathur, Sunnyvale, CA (US); Vinay Wadhwa; Mukesh Kumar, both of New Delhi (IN); C. Vinay Kumar Singh, Guragon (IN)

(73) Assignee: NetJumper, Inc., Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/204,214

(22) Filed: Dec. 2, 1998

Related U.S. Application Data

(63) Continuation of application No. 08/727,085, filed on Oct. 8, 1996, now Pat. No. 5,890,172.

(51) Int. Cl.[7] .................................................. G06F 15/16
(52) U.S. Cl. ........................... 707/501; 707/513; 345/339
(58) Field of Search .................................... 707/501, 513, 707/530, 3, 104; 70/10, 102; 345/329, 333, 335, 338, 339, 340, 346

(56) References Cited

U.S. PATENT DOCUMENTS

| | | | |
|---|---|---|---|
| 5,801,702 | * 9/1998 | Dolan et al. | 345/357 |
| 5,808,613 | * 9/1998 | Marrin et al. | 345/355 |
| 6,034,689 | * 3/2000 | White et al. | 345/357 |
| 6,038,610 | * 3/2000 | Belfiore et al. | 709/300 |

OTHER PUBLICATIONS

CNN Interactive, "http://cnn.com/index", Feb. 20, 1998, screen printouts, 7 pages.
AltaVista, "http://www.altavista.com", Feb. 20, 1998, screen printouts, 2 pages.
Adobe Acrobat 2.0 Exchange/Distiller Getting Started, Adobe Systems Incorporated, 1994, pp. 2–48.*

* cited by examiner

*Primary Examiner*—Stephen S. Hong
(74) *Attorney, Agent, or Firm*—Brooks & Kushman P.C.

(57) ABSTRACT

A computer implemented method and system for retrieving information through a browser connected to a network. A first file of information is received which includes a first mark-up language to identify contents of the information, which contents include site identifiers. The site identifiers corresponding for example to file locations on the Internet. The first file is displayed in a browser window. Responsive to receiving the first file of information by the browser, the first file of information is parsed by a jumper to generate a list of site identifiers. This list of site identifiers is then stored by the jumper and displayed in a jumper window. Responsive to an activation by the user, a computer is directed to perform the following steps. The jumper determines which of the stored site identifiers is currently selected and automatically selects the next. Next the jumper directs the browser to access the file at the site corresponding to automatically selected site identifier. Finally, the browser is directed to display the file the browser has retrieved in the browser window.

10 Claims, 14 Drawing Sheets

Figure 1:
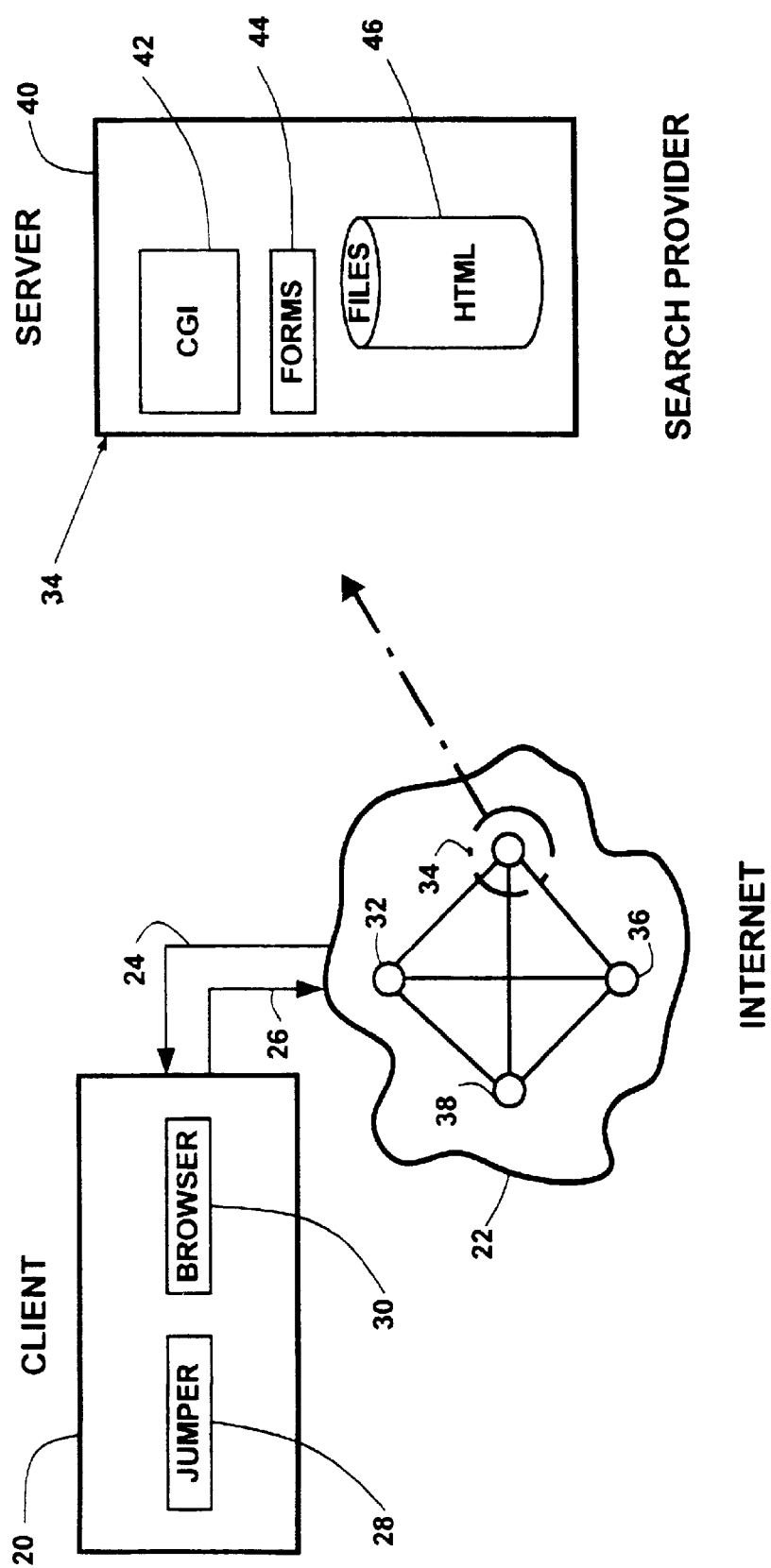

METHOD AND APPARATUS FOR RETRIEVING DATA FROM A NETWORK USING LINKED LOCATION IDENTIFIERS

This application is a continuation of U.S. application Ser. No. 08/727,085 filed on Oct. 8, 1996, now U.S. Pat. No. 5,890,172.

BACKGROUND OF THE INVENTION

1. Field of the Invention

The present invention relates to information retrieval. More specifically, the invention relates to tools for traversing hypertext data.

2. Background Information

The development of computerized information resources such as the Internet and various on-line services, such as CompuServe™, America On-Line™, Prodigy™ and other services has lead to a proliferation of electronically-available information. This electronic information is increasingly displacing more conventional means of information transmission, such as newspapers, magazines and even television.

The largest information resource in existence today is the Internet. The Internet is a group of client and server computers linked one to another and each having a unique identifier, DNS (distributed network server), assigned by the Internet authority in Cambridge, Mass. and Geneva, Switzerland. In order for information to be found on the Internet every file is given a specific address by which it may be located. To access the Internet a user employs what is called a browser. Currently the most popular browser is Netscape Navigator™ browser developed by Netscape Communications Corporation of Mountain View, Calif. A wide array of browsers is available for just about every platform. The browser's job is twofold. First, given a pointer to a piece of information on the net it has to be able to access the information or operate in some way based on the contents of that pointer. Second, if the document/file (hereinafter file) is encoded the browser has to translate that to a suitable format for display to the user. The display may include multimedia effects, e.g. sound and animation.

The most popular encoding of Internet files communicated between client and server is the HTML (hypertext markup language). The WWW (World Wide Web) or simply the "Web" includes all the servers adhering to this standard. Each page loaded from the Internet is a single file encoded in HTML. HTML describes the structure of a file. The structure of the file includes title, paragraphs, images and any pointers to other files.

The pointer to a specific site is called an URL (Uniform Resource Locator). The URL provides a universal, consistent method for finding and accessing information for a Web browser. The URL comprises a file type, a server I.D. (DNS), one or more directories and subdirectories, and a file name. URLs are also used as part of a hypertext link within a file to another file. These URLs then provide the browser with a way to navigate the Web. URLs contain information about a file: including file type (FTP, Gopher, HTTP), the Internet server on which the file is located (WWW.NCSA.UIUC.EDU, or FDP.APPLE.COM, or Net Com 16.Net.Com, and so on), the directory of the file, and the file name.

In order to speed the process of finding relevant information on the Internet several servers on the Internet provide an index to the Internet and a search engine. These information indexers such as Yahoo™, Excite™, Lycos™, Inktomi™, and Alta Vista™ perform two valuable functions. First, using their own Internet links, they continually search the Internet and index all files on the Internet into subject categories and store this index on their own database. The information indexers also allow a client to connect to their server and enter a search query. In response the information indexer provides a list of all files on the web that meet the search criteria. Therefore, the information indexer such as Yahoo™ not only updates and maintains a topical index for all files on the web, but also makes that index searchable by a client. It should be noted that the information that is retrieved from Yahoo™ contains only a general topic identifier and the file location on the Internet for that specific topic.

It would indeed be a cumbersome process for the client seeking specific information if the indexes that were retrieved from Yahoo™ only told the searcher where to look. If this were the case, the considerable task remaining to the client would be to manually enter the network address, URL, of each file and the go through the process of retrieving that file. To overcome this problem, the search result retrieved by Yahoo™ is encoded in HTML as a hot-link which makes every "footnote" an active rather than a passive reference. These hot-links appear to the user in the browser window as bold face text which is easily distinguished from the other text based information in the file. A hot-link comprises a text description and a corresponding URL. When the user selects a hot-link the browser detects that selection and outputs the URL on the Internet to retrieve the file corresponding to that URL and display it to the user. Therefore, by merely selecting with a mouse a specific footnote in a file encoded in a markup language, a client is immediately given access to the remote web server that contains the specific file referred to in the footnote.

With a markup language such as HTML (hypertext markup language) both amateurs and professionals become authors and the footnotes on the printed page become the hypertext of the electronic page. What was a passive reference now becomes an accessible link to a related file. A markup language describes the structure of a file including headings, paragraphs, images and what are called hot-links. A hot-link displays at the user level as text or graphic and is processed for communication purposes as an URL. It is these hot-links which provide the interactive footnotes described above.

Even with the indexing provided by Yahoo™, Lycos™, Excite™, Inktomi™, Alta Vista™, etc., the process of finding the exact topic is still extremely time consuming and can involve visiting literally hundreds of Web Sites. Typically, a user will retrieve a file from an information indexer and will not only look at the files retrieved by selecting the indexers hot-links, but will also select other hot-links in the retrieved documents. This process of starting a search that begins with an initial hot-link and following a search trail that leads to successive files each increasingly displaced from the starting point is known as a drill-down. The problem with current browsers is that when a user has drilled-down through many levels of sites, the only way to return to the original HTML file is to hit the browser's back key which moves the user up one level at a time through the original search tree back to level "1." Only then can the user access other hot-links retrieved in the original search.

What is needed is a more efficient way to conduct a search.

SUMMARY

A first object of the invention is to provide operational controls for simplified Internet navigation from various sites and back again.

A second object of the invention is to save users time and effort in finding information on the Internet.

A third object of the invention is to enable the publication of a new format for on-line magazines, called Netazines, which allow publishers to leverage the navigational controls provided in the invention product to foster a new paradigm for browsing magazine style information on the Internet.

A computer implemented method and system for retrieving information from a network. In a first embodiment a first file of information is received which may include a first mark-up language to identify contents of the information, which contents include site identifiers. The site identifiers corresponding for example to file locations on the Internet. The first file is displayed in a browser window. Responsive to receiving the first file of information by the browser, the first file of information is parsed by a jumper to generate a list of site identifiers. This list of site identifiers is then stored by the jumper and displayed in a jumper window. Responsive to an activation by the user, a computer is directed to determine which of the stored site identifiers is currently selected and automatically selects an other. The other includes the first, the prior, the next, or the last on the list.

In a second preferred embodiment a first file of information in a hypertext markup language is received and displayed in the browser window. The first file of information also contains site identifiers and other information. The first file is displayed in the browser and is parsed, and the site identifiers from that file are stored by the jumper in a list. The stored list of site identifiers is displayed in the jumper window. Responsive to a selection by a user of automatic mode, a computer is directed to perform the following steps. The jumper selects a first site identifier from the stored list of site identifiers. The jumper directs the browser to access the file at the site corresponding to the automatically selected site identifier. The browser, is directed by the jumper, to display the file in the browser window. Then the jumper initiates a delay of a predetermined interval. At the end of the interval the jumper selects the next site identifier from the stored list of site identifiers. The jumper directs the browser to access the file at the site corresponding to the automatically selected next site identifier. The browser, is then directed by the jumper, to display that file in the browser window. The jumper continues to repeat this animation loop from one site identifier in the stored list of site identifiers to the next, until either the entire list of site identifiers has been sent to the browser and displayed, or until the user terminates the process. In this manner, an animated tour of all files having site identifiers parsed from the first file is displayed in the browser window under the direction of the jumper.

In a third embodiment, a first file of information in a hypertext markup language is received and displayed in a browser window. The first file of information also contains a site identifier and other information. The first file of information is displayed by the browser in the browser window. Responsive to receiving the first file of information, the jumper parses the first file and extracts and stores a list comprised of first file site identifiers. The stored list of site identifiers is then displayed in the jumper window. The user is allowed to select from the browser window a specific site identifier, known as a search level "1" site identifier, and responsive thereto to cause the browser to access and display a second file retrieved from the site corresponding to the selected level "1" site identifier. This second file includes a hypertext markup language and site identifiers. The user is again allowed to select from the browser window a specific site identifier and responsive thereto causes the browser to access and display a third file retrieved from the site corresponding to the selected site identifier. This process can be repeated in the browser, until the user has completed their search, or drill-down.

Responsive to the completion of the drill-down in the browser, as indicated to the jumper by receipt of a single jump selection from the user, the computer is directed to perform the following steps. The jumper determines which of the stored level "1" site identifiers is currently selected and automatically selects the single jump level "1" site identifier. Next the jumper directs the browser to access the file at the site corresponding to the single jump selected level "1" site identifier. Finally, the browser is directed to display the file the browser has retrieved in the browser window. This allows the user to return to the files pointed to by the original level "1" site identifiers without having to traverse in reverse serial order the site identifiers selected in the drill-down.

BRIEF DESCRIPTIONS OF DRAWINGS

The present invention is illustrated by way of example and not limitation in the figures in which like references indicate like elements and in which:

FIG. 1 shows a client server system including embodiments of the jumper invention.

Figure 2:
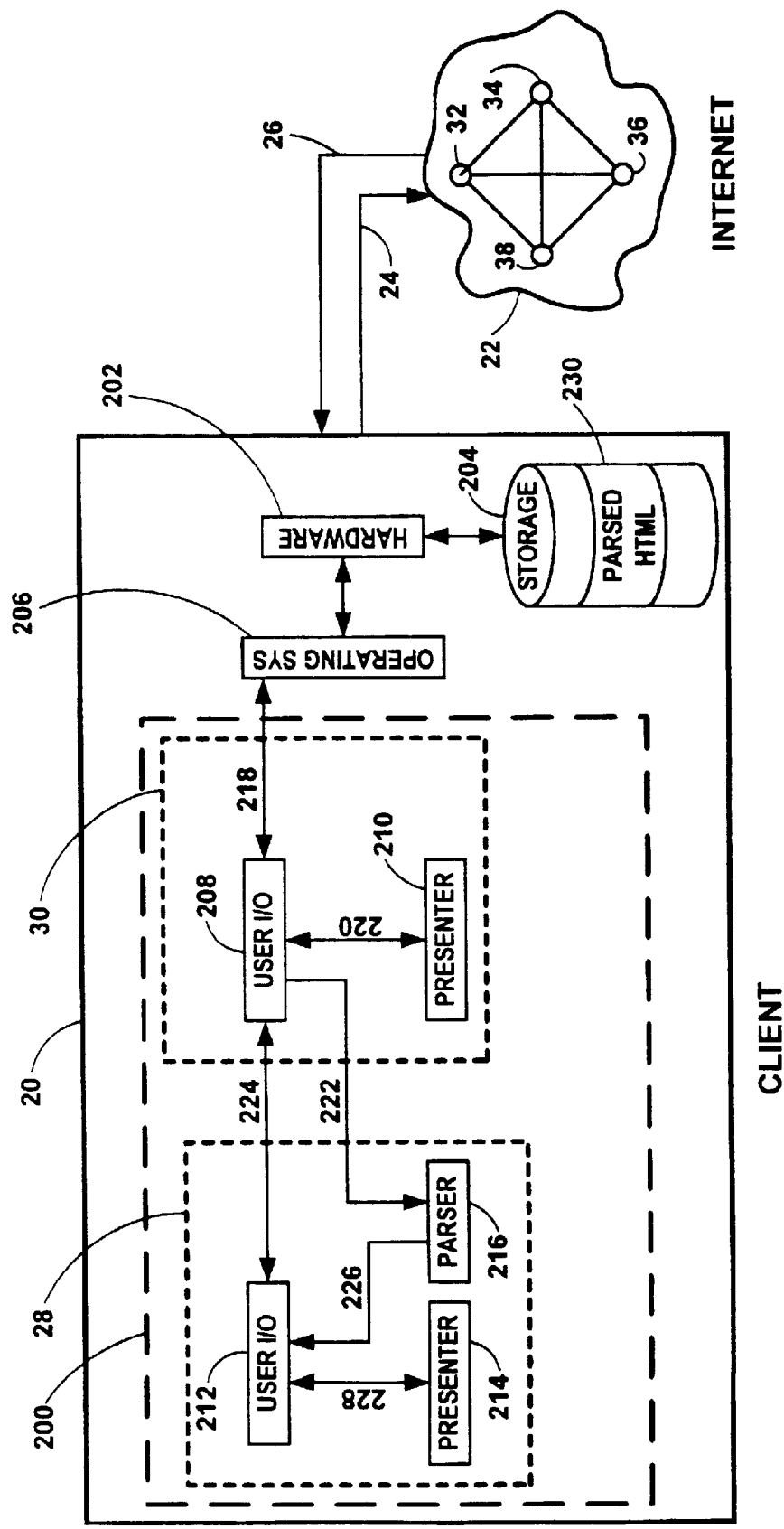

FIG. 2. shows a more detailed view of the client server system illustrated in FIG. 1.

Figure 3:
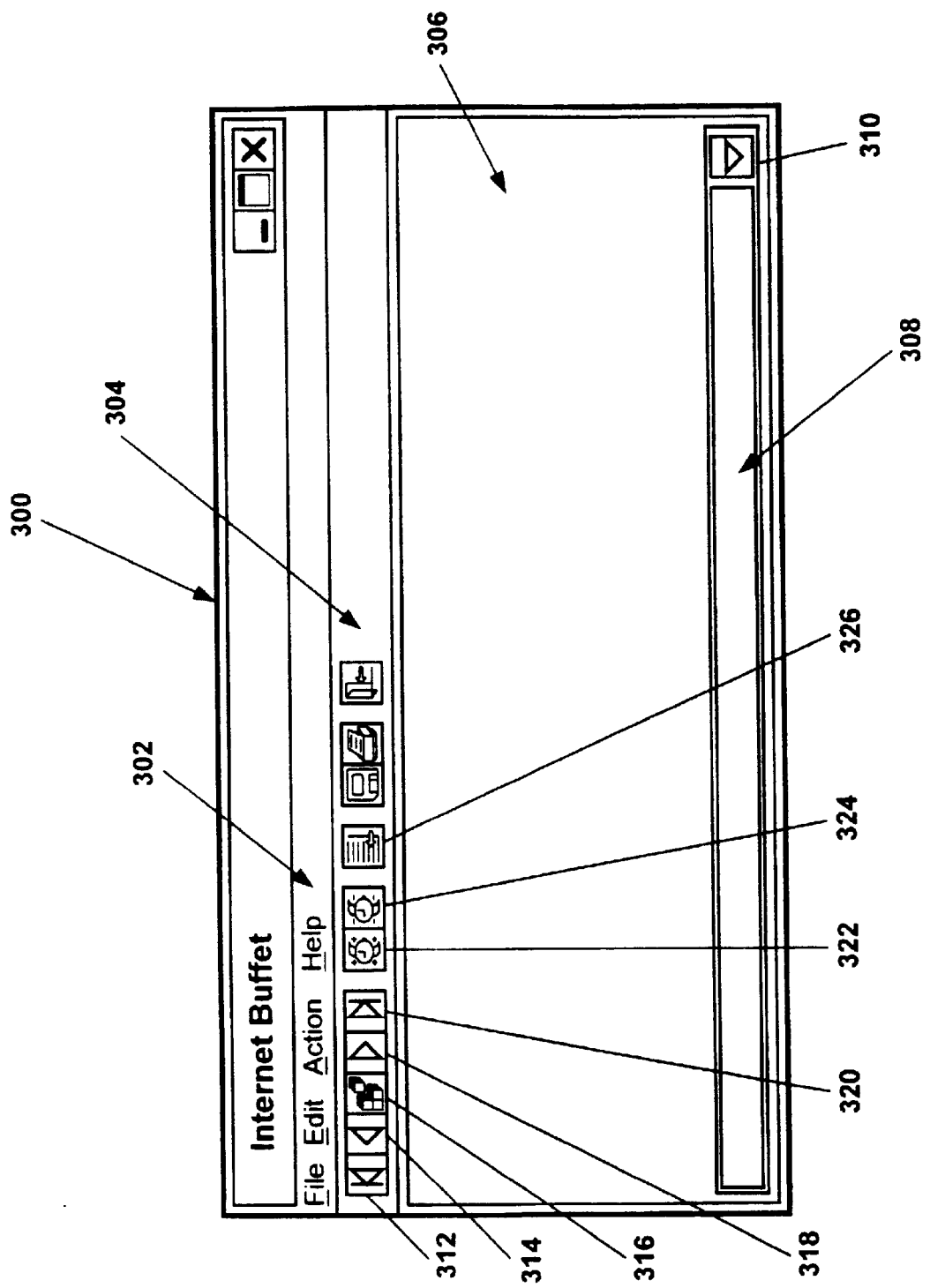

FIG. 3. shows a preferred embodiment of the screen interface and tool bar of the jumper.

Figure 4:
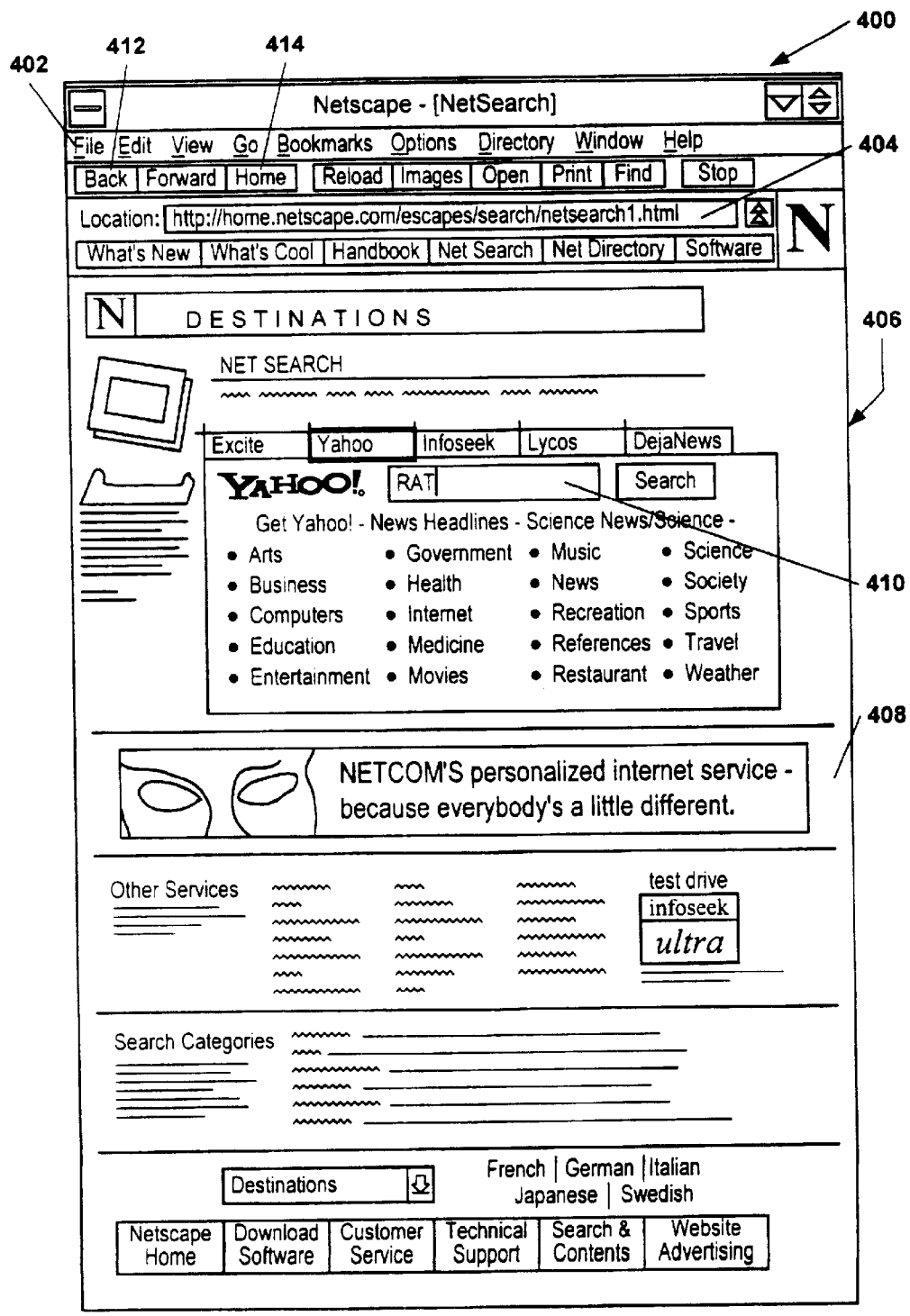

FIG. 4 shows a prior art browser user interface, and the query form of an information index provider.

Figure 5A:
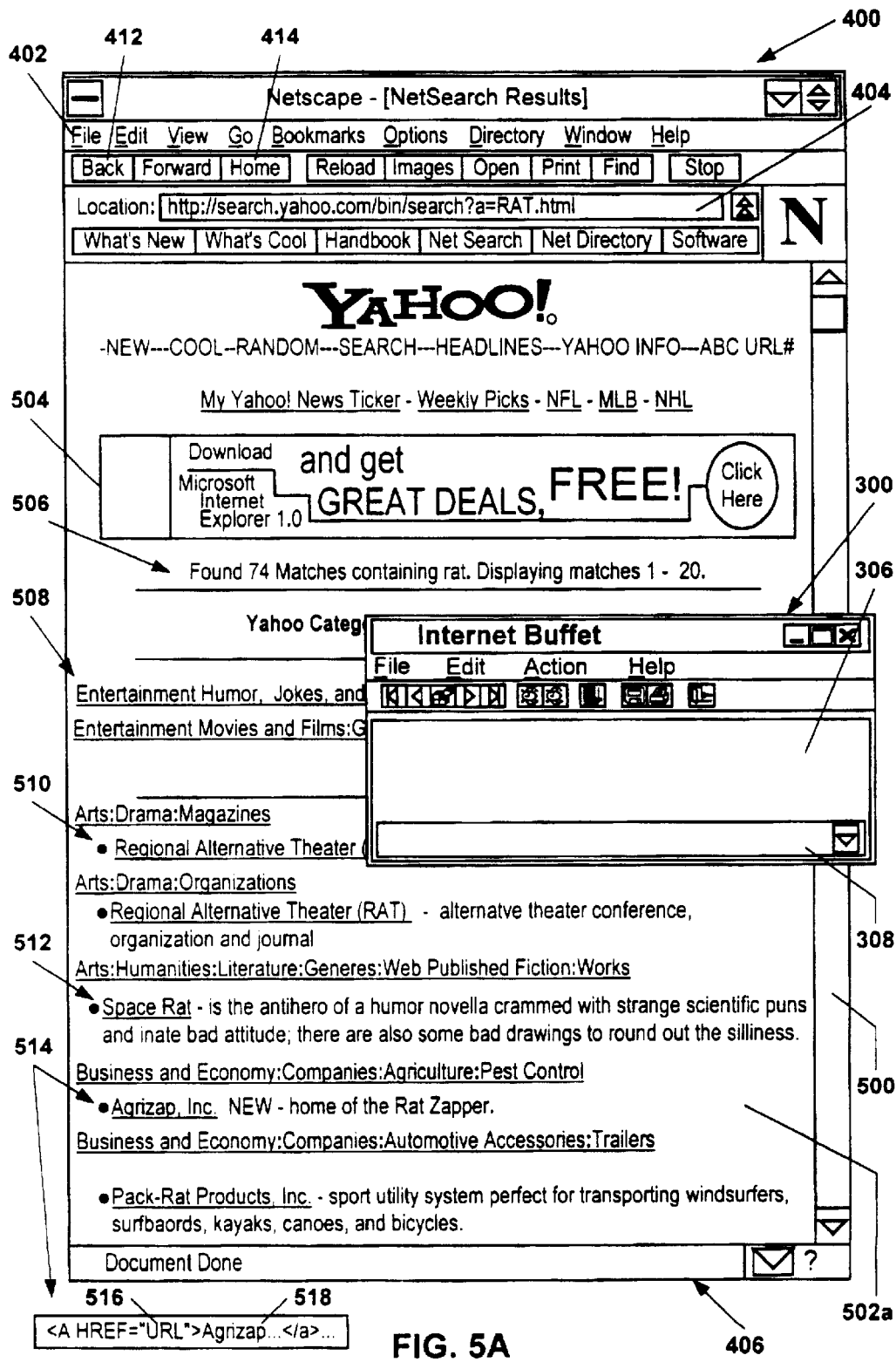
Figure 5B:
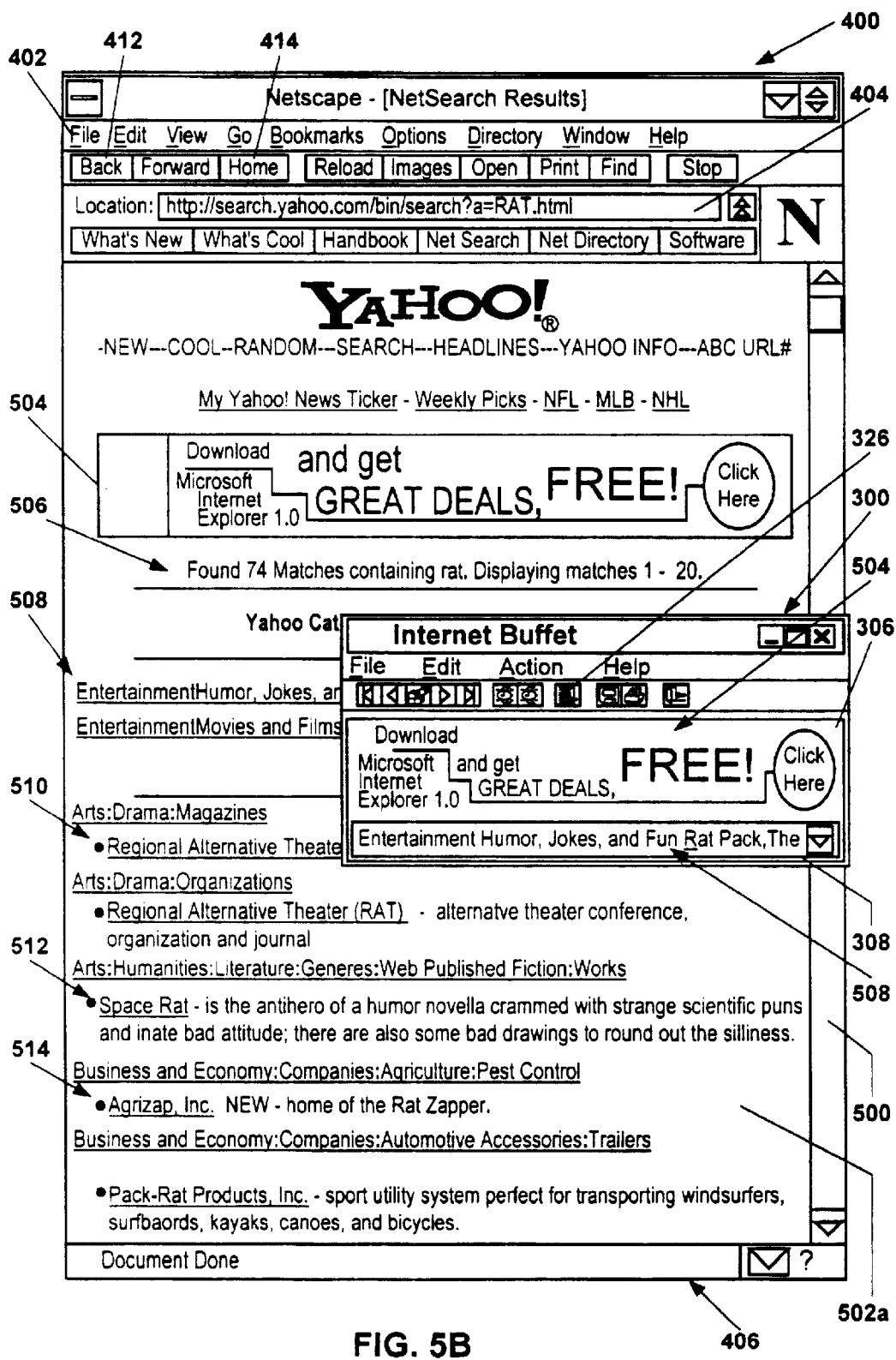
Figure 5C:
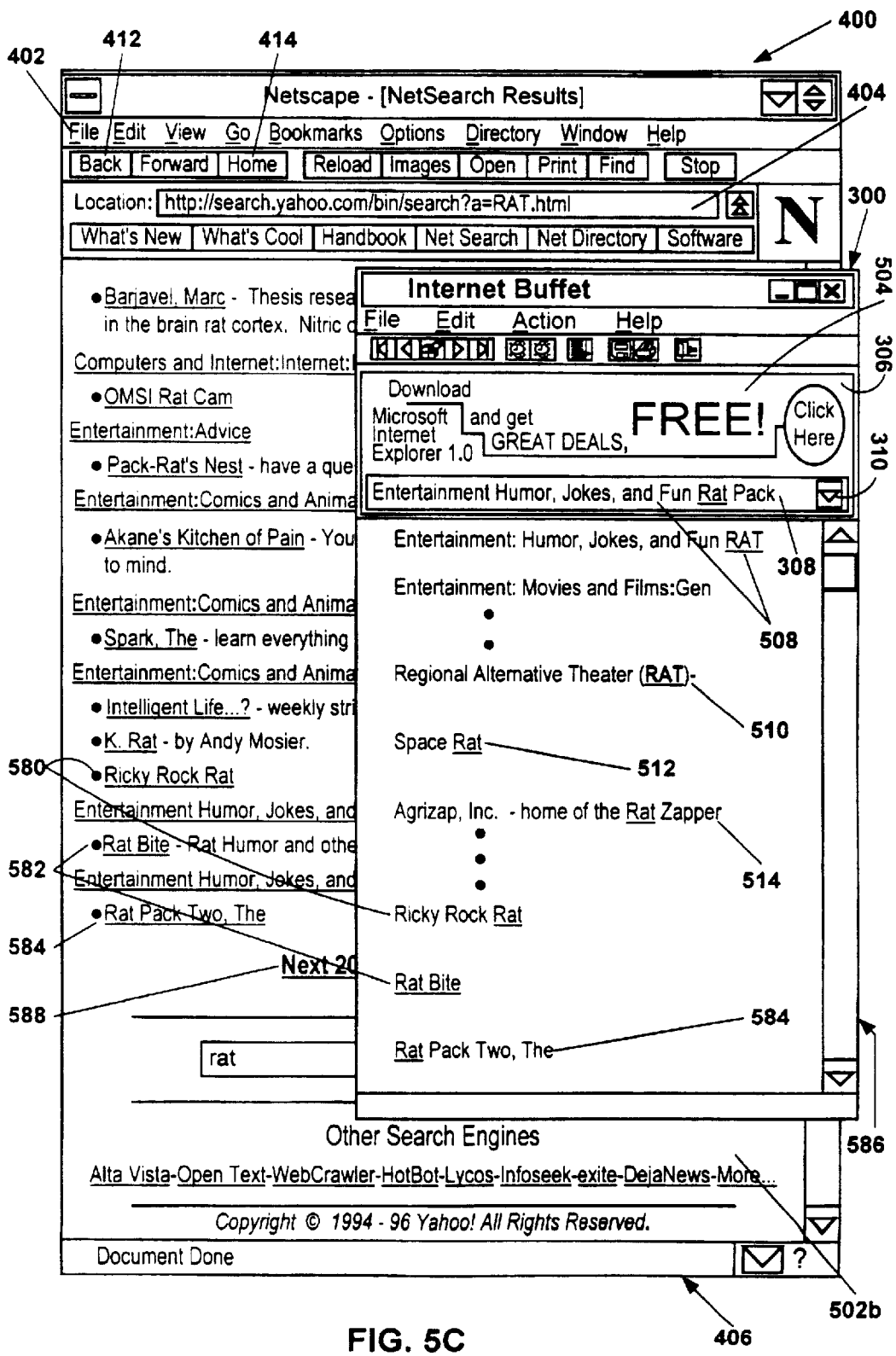

FIGS. 5A–C shows a the initial stages of a search session utilizing a prior art browser and the jumper.

Figure 6:
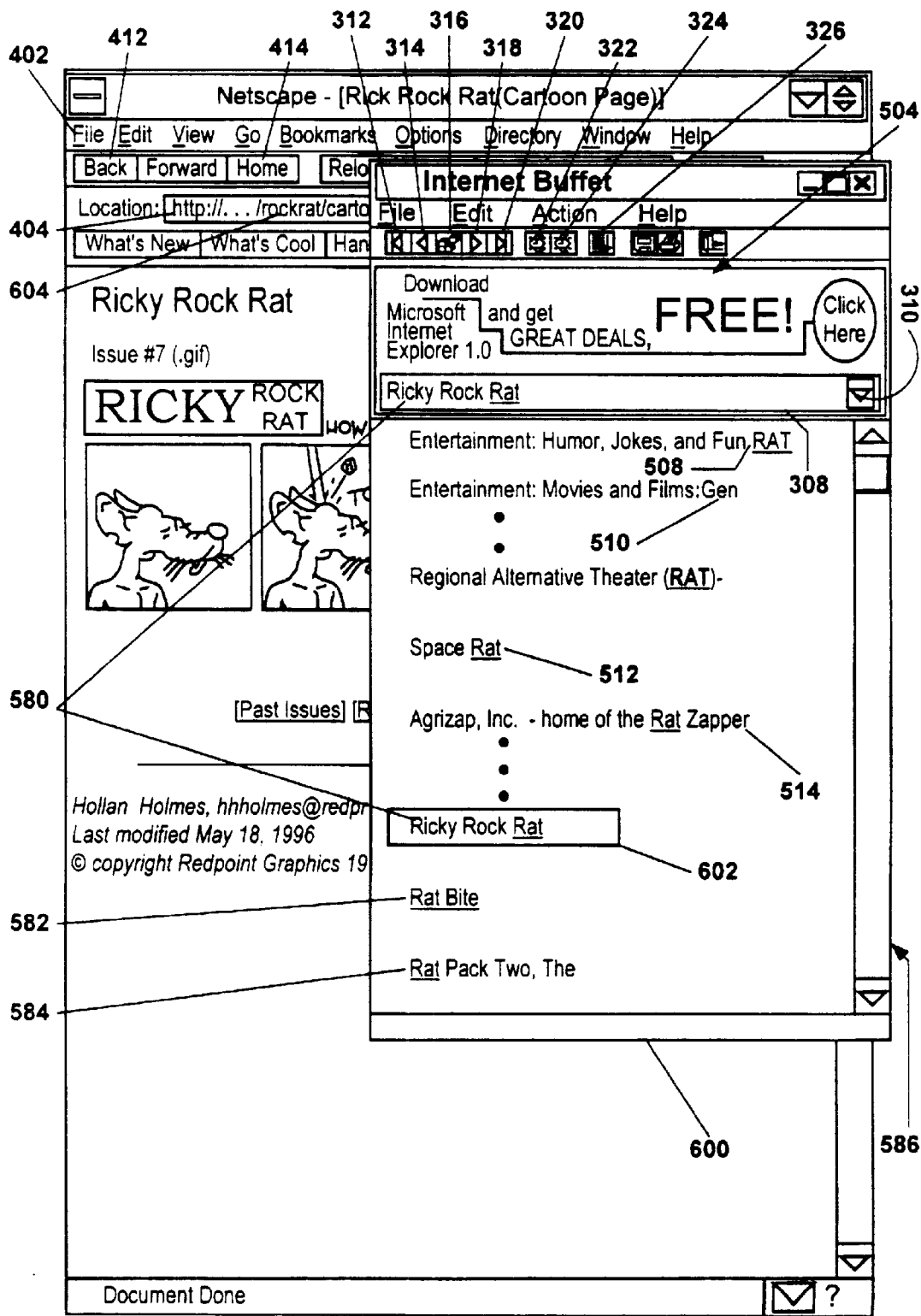

FIG. 6. shows a later stage in the search session of FIGS. 5A–C.

Figure 7:
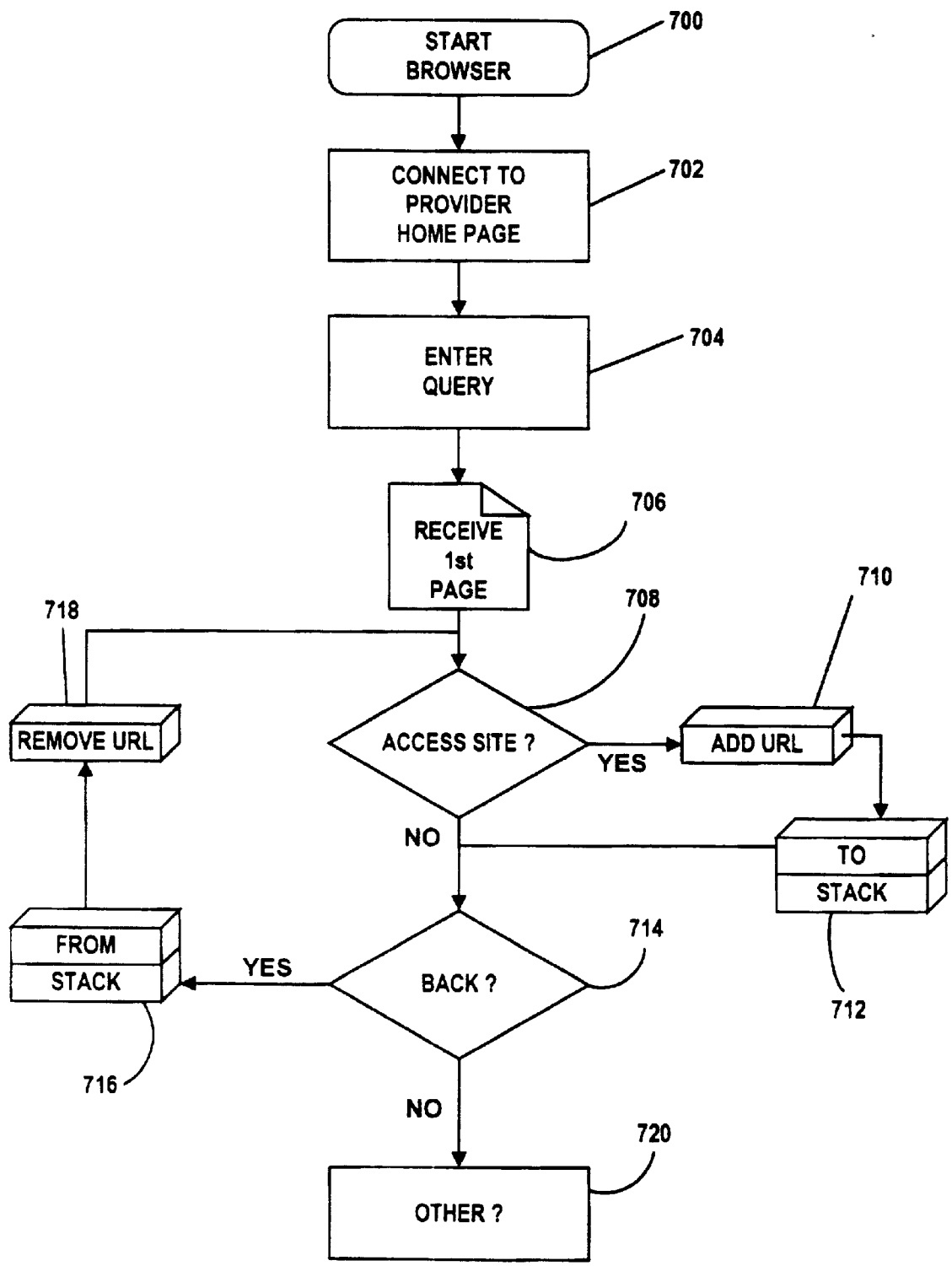

FIG. 7. shows the steps in the search process in prior art browsers.

Figure 8A:
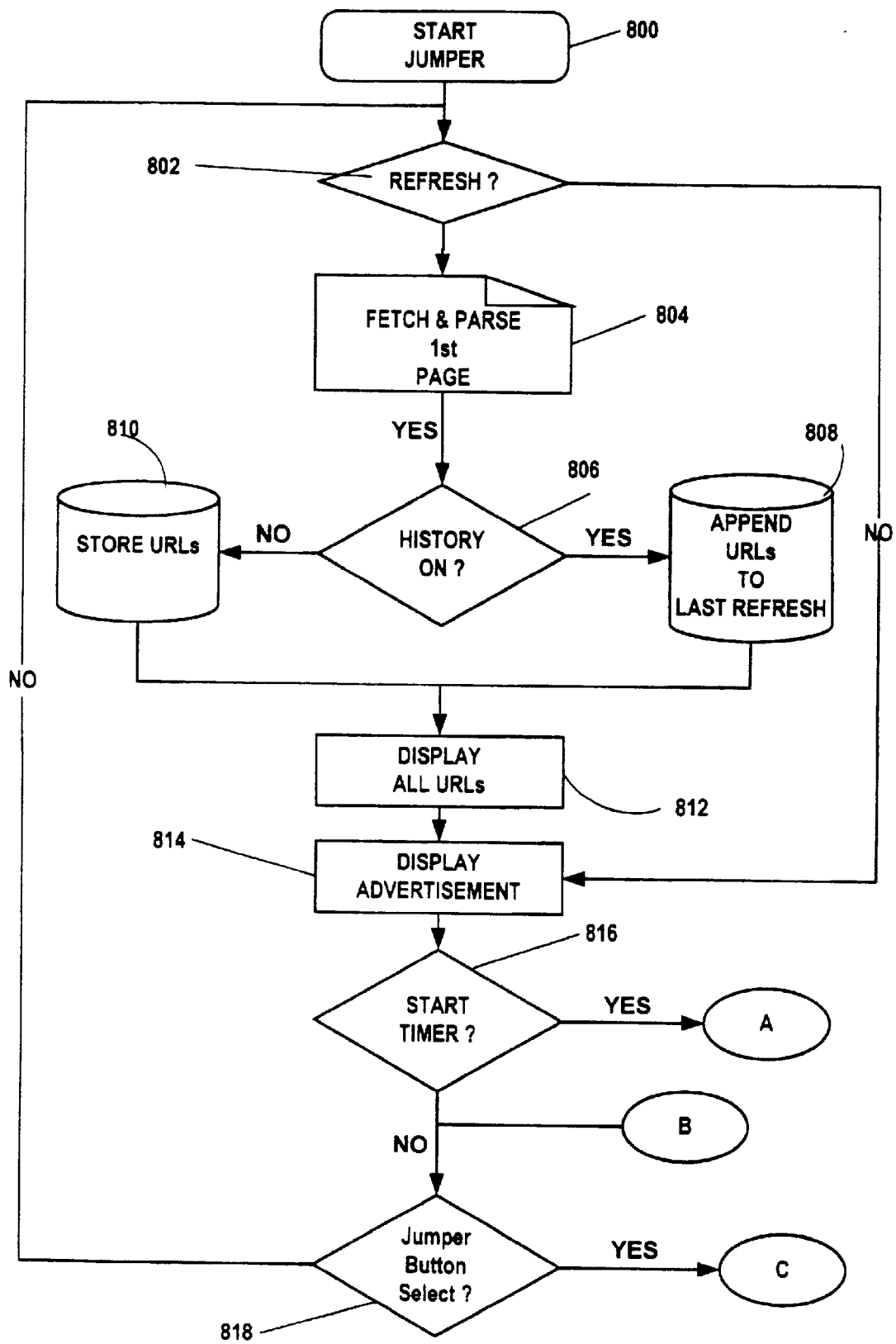
Figure 8B:
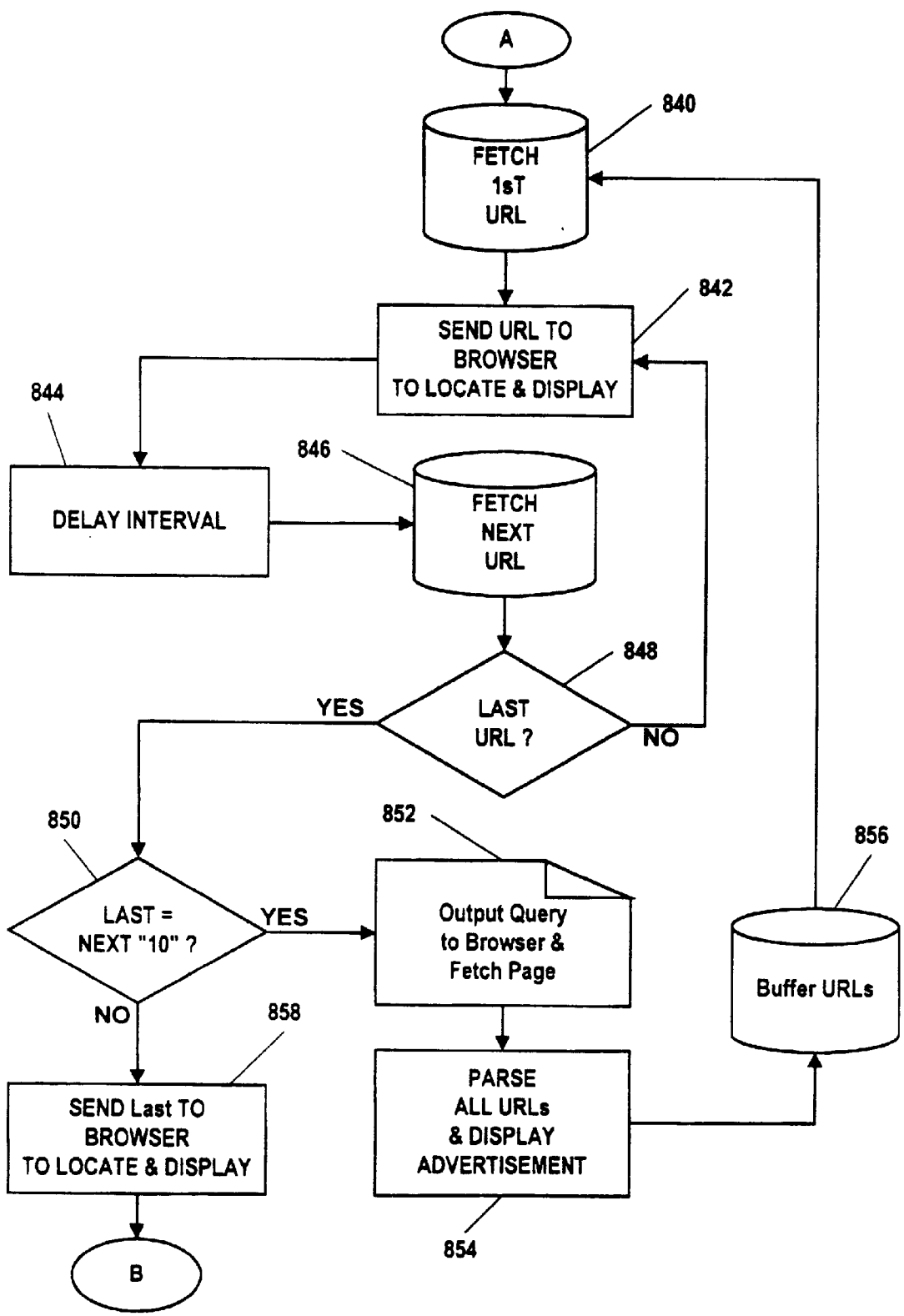
Figure 8C:
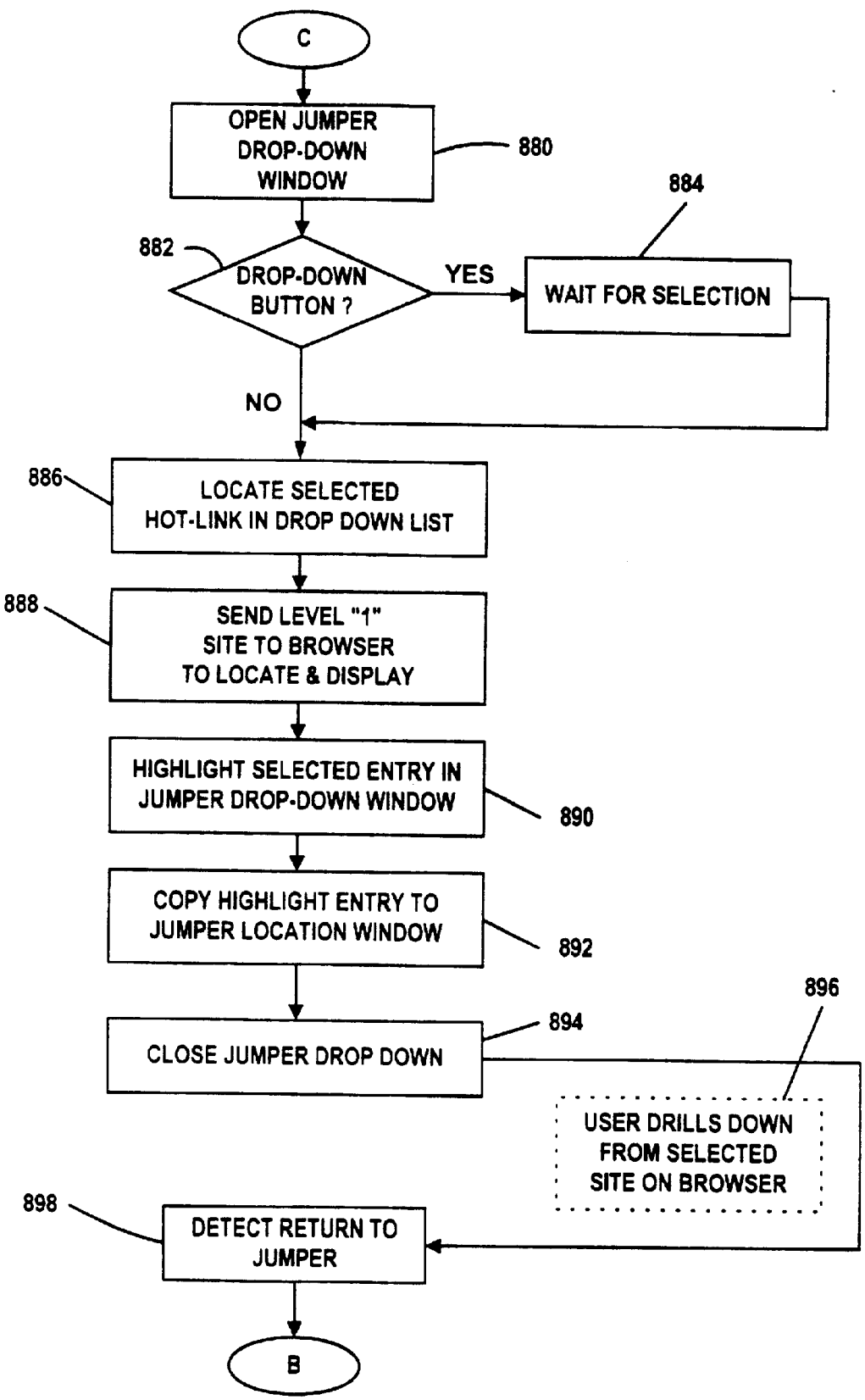

FIGS. 8A–C shows the processes of a search session on the jumper.

Figure 9A:
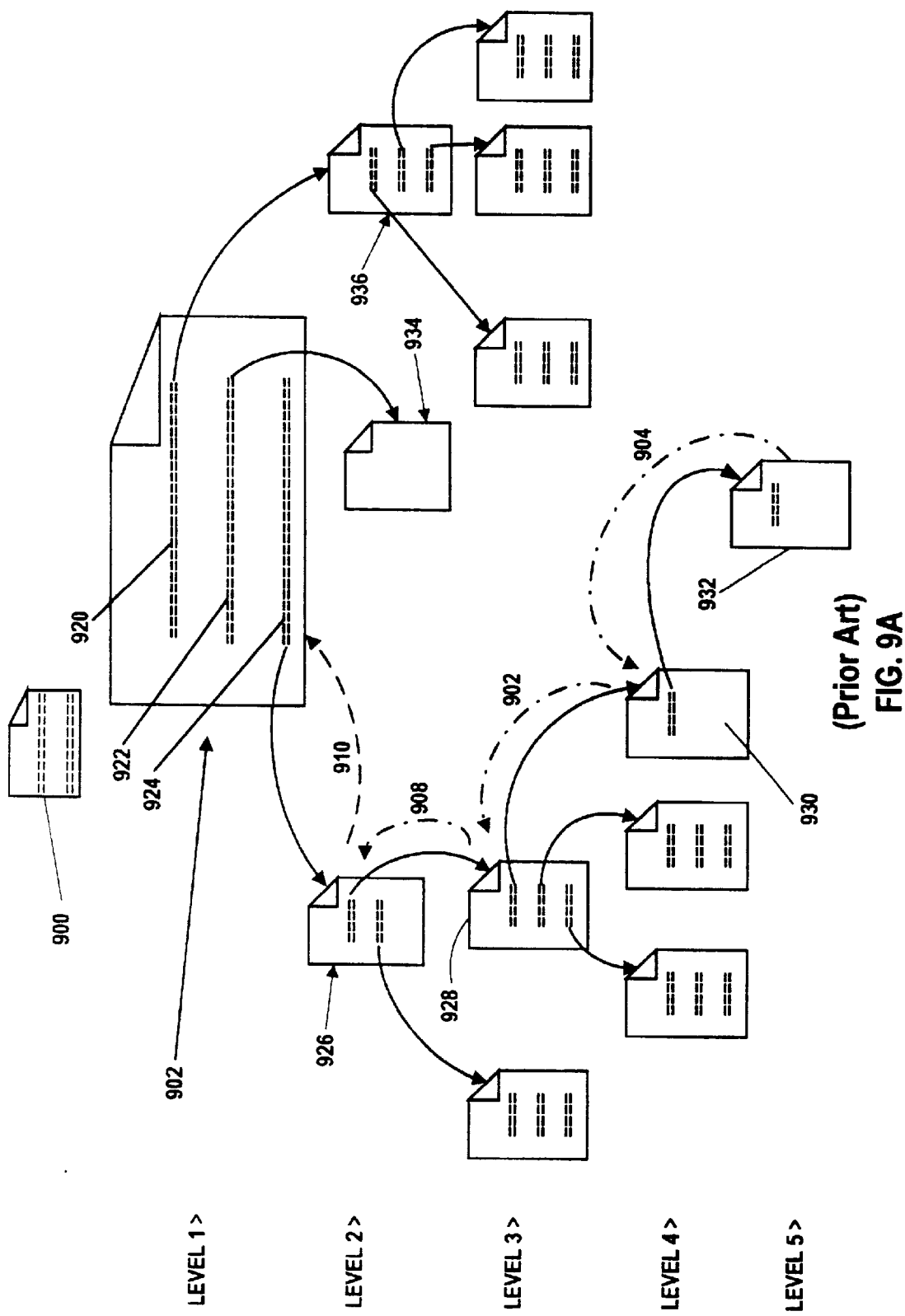
Figure 9B:
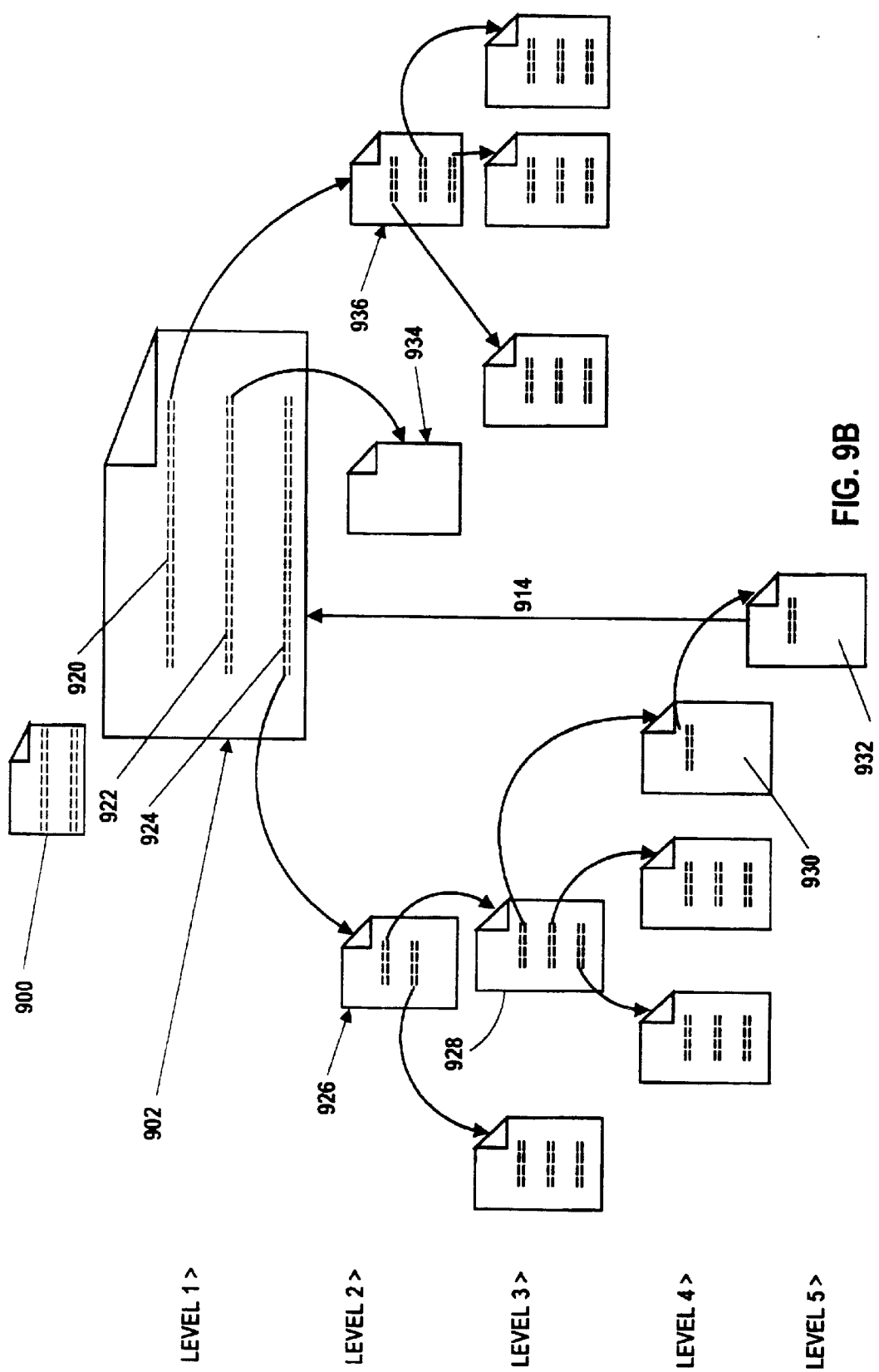

FIGS. 9A–B show the search traversal patterns of a prior art browser and the jumper.

DETAILED DESCRIPTION

One embodiment of the invention is a method and apparatus for retrieving information through a browser connected to a network, and providing the information to a user. Although the following will be described with reference to certain particular embodiments, including data structures, flow of steps, hardware configurations, menu configurations, etc. . . , implementation of the invention can be practiced without these specific details.

One embodiment of the invention allows a search to be conducted in non-linear order. This may be done in either single jump or automatic jump mode utilizing a jumper. A search tree does not therefore need to be traversed in reverse serial order after a drill-down as is required utilizing prior art browsers. The invention allows a searcher to jump across multiple levels at a time.

Search Levels:

The operation of prior art browsers is best described by reference to FIG. 9A. FIG. 9A shows a series of hypertext files. The files may be resident on a hard drive, a local network, a wide area network or the Internet. Three hot-links are shown 920, 922, 924 on file 902. Hot-link 924 is shown as linked to four levels of files. Selecting hot-link 924 causes the browser to access file 926, which is a level 2 file. Selecting the first hot-link on file 926 causes the browser to access file 928, which is a level 3 file. Selecting the first hot-link on file 928 causes the browser to access file 930, which is a level 4 file. Finally, selecting the first hot-link on file 930 causes the browser to access file 932, which is a level 5 file. Selecting hot-link 922 causes the browser to access file 934, which is a level 2 file. Selecting hot-link 920 causes the browser to access file 936, which is a level 2 file.

The traversal steps from hot-link 924 through 926, 928, 930 and 932 constitute a drill-down from level 1 to level 5. Prior art browsers require that the user, in order to return to the original file 902, must traverse the search tree in reverse serial order. As shown serial return 904 traverses from 932 to 930, serial return 906 traverses from 930 to 928, serial return 908 traverses from 928 to 926, and finally serial return 910 traverses from 926 to 902, the initial starting point. This requires the needless steps of visiting each of the branches traversed in the drill-down. This process is unnecessarily time consuming when compared with the capabilities of the current jumper invention.

FIG. 9B shows the same tree structures as does FIG. 9A. FIG. 9B shows the use of one embodiment of the invention to traverse many levels at a time in either single jump or automatic jump mode. In the single jump mode when the searcher has reached level 5 file 932. If the user wants to return to level 1 they do not need to do so in reverse serial order, as is required by prior art browsers. Instead, the user directs the jumper to access the next level 1 hot-link. In response, the jumper returns the user in a single jump 914 from level 5 file 932 to the level 2 files pointed to by the hot-links in the level 1 file 902. Much time is saved and the user can proceed to search other level 1 hot-links. In automatic jump mode, the user instructs the jumper to access all hot-links on the level 1 file 902. In response, the jumper directs the browser to access and display in the browser window each of level 2 files 926, 934 and 936. These files are accessed by the browser in response to the jumper sending at timed intervals each of hot-links 924, 922, and 920 from a parsed hot-link list to the browser. The browser accesses each of the files 926, 934, and 936 to which hot-links 924, 922, and 920 respectively point. This allows the user to see an animation in the browser window for a timed interval.

Hardware:

In order to better understand the operation of a jumper, it is necessary to first understand an environment in which the jumper is practiced. FIGS. 1–2, show the hardware environment in which the jumper operates. As shown in FIG. 1, an Internet 22 is connected to client 20 by an incoming Internet line 24 and an outgoing Internet line 26. Jumper 28 and browser 30 are part of client 20. Internet 22 comprises servers 32, 34, 36, and 38. Each server contains HTML files. The client and all servers are linked electronically. Server 34 is shown as the server of an information indexer. The server comprises a CGI 42 (common gateway interface), forms 44 on which a user query is entered, and storage containing an updated topical index 46 of all files on the web. To access a specific site on the network, browser 30 outputs an URL across outgoing Internet line 26. Routers on the Internet establish an electronic link between the client 20 and the appropriate server 32–38. Communications with the Internet are received on incoming Internet line 24.

The client hardware architecture for both the browser and the jumper is shown in greater detail in FIG. 2. The client 20 contains storage 204, computational hardware 202, operating system 206, and GUI (Graphical User Interface) 200. The storage 204 contains a storage segment 230 in which the jumper stores parsed HTML files. Hardware 202 comprises a microprocessor, an I/O interface, a display and a bus connection to storage 204. The operating system 206 may comprise a bios and an operating environment such as System 7™, Unix™ or Windows™. The GUI 200 comprises jumper 28 and browser 30. Browser 30 comprises user I/O 208 and presenter 210. The jumper 28 comprises user I/O 212, presenter 214, and parser 216.

The operation of hardware 202 is controlled by the operating system 206. The operating system and graphical user interface (GUI) 200, create the local environment in which the jumper 28 and browser 30 exist. The browser user I/O 208 handles the tasks of sending and retrieving communications 218 via the operating system 206 and hardware 202 to the Internet 22. The browser handles Internet communications for the jumper. The browser user I/O communicates with the jumper user I/O 212 via jumper-parser I/O protocol 224. The browser user I/O also handles the task of translating files received from the Internet, e.g., HTML encoded files, to the presenter 210 via presenter protocol 220. Additionally, browser user I/O uploads at the direction of jumper user I/O 212, HTML encoded files to parser 216 via browser I/O-jumper parser protocol 222.

Jumper parser 216 handles the task of converting an HTML encoded file uploaded from browser user I/O 208 into a format suitable for a single jump or automatic jump mode search, as discussed above in connection with FIG. 9B. The parser extracts from the HTML file: an advertisement, a plurality of URLs and topic descriptors corresponding to each URL. The parser passes these via jumper-parser I/O protocol 226 to jumper user I/O 212. Jumper user I/O 212 communicates with jumper presenter 214 via jumper I/O -presenter protocol 228 to display to the user available jump sites and to provide a user interface by which the user may input commands. Jumper user I/O also communicates with browser I/O 208 via browser I/O-jumper I/O protocol 224.

User Interface:

An embodiment of the jumper user interface is shown in FIG. 3. This interface allows the user to see all the hot-links on a given level and to select a hot link in either single jump or automatic jump mode as described above in connection with FIG. 9B. The jumper thus enhances the search capabilities of the browser.

Jumper window 300 comprises a menu bar 302, a button bar 304, an advertisement area 306, a jump site window 308, and a drop-down list button 310. The jumper menu bar contains file, edit, action, and help items. Jumper button bar contains a first entry button 312, a previous entry button 314, a random jump button 316, a next entry button 318, a last entry button 320, a start timer button 322, a stop timer button 324 and a refresh/update button 326.

The jump site window 308 has an associated drop down list accessible by selecting drop-down-down list button 310. This list comprises parsed hot-links. These hot-links are extracted from a file initially retrieved by the browser. Any one of the hot-links in the parsed list can be selected by the user with a mouse. This drop-down list provides one method for selecting a specific Internet site to jump to. Advertisement area 306 contains an advertisement parsed from an HTML page received by the browser. Button bar 304 provides controls for single jump and automatic jump mode. All buttons relate to the hot-links in the jumper's parsed list regardless of how far the user has drilled-down in the browser. All buttons return the user to at least one of the hot-links on the list and direct the browser 30 shown in FIGS. 1–2 to retrieve a file from the site corresponding to the URL associated with the hot-link and further direct the browser to display that file to the user.

First entry button 312 allows the user to return from a drill-down to the first entry on parsed list. Previous entry button 314 returns the user to the prior hot-link on the list. Random jump button 316 returns the user to a randomly selected hot-link on the parsed list. Next entry button 318 selects the next hot-link on the list, and last entry button 320 accesses the last entry on the list. Start timer button 322 initiates the automatic and successive selection of every hot-link on the parsed list and the browser responsive thereto, displays for the user a file retrieved from the URL corresponding to each hot-link. The animation initiated by start timer button is terminated by stop timer button 324. Refresh/update button 326 causes all hot-links in a file which the browser has retrieved to be parsed and uploaded and displayed in the drop-down list of jumper window 300. Additionally, this parsed list is stored in HTML storage segment 230 as shown in FIG. 2.

In alternate embodiments the jumper window may take any of several forms. The user interface may include popup or persistent window, a toolbar, a menu modification of the browser window, a toolbar modification of the browser window, or the use of accelerator keys on the keyboard.

FIG. 4 shows a prior art browser user interface and a query form of an information index provider. This interface allows the user to access web files and also displays the file contents to the user. The browser interface 400 is that of Netscape Navigators™. The browser interface includes a browser menu bar 402, a site window 404, and a window 406 for viewing a file. The browser menu bar includes a back button 412 and a home button 414. The file shown in the view window is the query form 408 of Yahoo™. The query form has a query field 410.

The browser menu bar 402 generally provides for editing and saving files. Back button 412 allows the user to move back a search tree in reverse serial order as shown in FIG. 9A. Home button 414 allows the user to return to their home page 900 in the browser window. The browser site window 404 displays the URL corresponding to the file currently being displayed, in this case the query form 408 of Yahoo™. The query form is encoded in a markup language and contains a query field 410 in which the user may enter the search topic for which a topical of the web is desired. In this case, the search topic is "Rat." When the search topic is entered, it is sent by the browser over the web to Server 34 owned by Yahoo™ 40 and shown in FIG. 1.

Conducting a Search:

FIGS. 5A–C show the initial stages of a search session conducted with the jumper and browser. A browser interface 400, a file retrieved by the browser, and a jumper window 300 are shown. These are the basic tools for the demonstrative search. The initial file retrieved from Yahoo™ in response to the query "Rat" is shown as an upper page portion 502a and a lower page portion 502b in FIGS. 5A–B and 5C, respectively. These are accessed by scrollable window bar 500. The retrieved file contains an advertisement 504, a search result summary 506, a plurality of hot-links of which 508–514 and 580–584 are referenced. A representative hot-link 514, is shown to contain both an URL 516 and a text portion 518. In FIG. 5C a jumper drop down list 586 is shown. In addition, the retrieved file also contains a next feature 588.

In response to the entry of the query "Rat" as shown on FIG. 4, the query is sent by browser to Yahoo™. The topical index 46 at Yahoo™, shown in FIG. 1, is searched and the file 502a–b containing all related level 1 hot-links and other information is returned to the client 20 and displayed to the user by the browser as 502a–b. Page 502a is captioned with an advertisement 504. Immediately below the advertisement is a search result summary 506, which indicates 74 matches pertaining to the word "Rat" and display of the first 20 hot links for those matches. Various hot-links with subject descriptions appear on the page in bold text with underlining. These are, for example, 508, "Entertainment, Humor. . .", 510, "Regional Alternative Theater. . .", 512, "Space RAT. . .", 514, "Agrizap, Inc. . .".

Each hot-link as discussed above is an active reference. For example the hot-link 514 comprises a hypertext identifier "<A", an URL 516, a text portion 518 and a closing identifier. The browser displays to the user only text portion 518 and any images that may accompany it. These are highlighted and underlined on the user display to indicate to the user that when they are selected with a mouse a corresponding URL will be sent by the browser to the Internet to access the specific file referred to by the URL.

As shown in FIG. 5B, jumper window 300 has been refreshed via refresh/update button 326, discussed above in connection with FIG. 3. Responsive to selection of refresh/update button 326, the file 502a–b is passed from the browser 30 to the jumper parser 216 as shown in FIG. 2. All hot-links including the referenced hot-links 508–514 and 580–584 are extracted and passed to jumper user I/O 212. These are passed to jumper presenter 214 and displayed in the jumper window 300. Specifically the advertisement 504 is displayed in jumper advertisement area 306, and all hot-links 508–514 and 580–584 are put in the jumper drop down list. The first of these hot-links 508 is displayed in the jumper site window 308.

In FIG. 5C, the lower portion 502b of the retrieved HTML page is shown. It contains hot-links 580, 582, 584. In jumper window 300 and specifically jumper site window 308 thereof, the jumper drop-down window, 586, is shown. This window has been accessed by the user's selection of jumper drop-down list button 310. The drop-down list contains all hot-links that were obtained from the original file 502a–b including the referenced hotlinks 508–514 and 580–584.

Now, by reference to FIG. 6, a later stage of the search session is shown. FIG. 6 shows a file 600 in browser view window 406, an URL corresponding to file 600 in browser site window 404, and a highlight 602 around hot-link 580 in both the jumper drop-down list window 586 and the jumper site window 308. The file 600 was obtained in a drill-down conducted in the browser window 406. The steps in that drill-down intervening between FIG. 5C and FIG. 6 have not been shown. The drill-down however resembles that shown and discussed above in connection with FIG. 9A. The file 600, shown in browser window 406 is four levels removed from the initial level 1 hot-link 580. The drill-down was conducted on the browser view screen by selecting the hot-links presented in the files retrieved by the browser. If the user desires to return to the an other hot-link from the level 1 file, shown as 502a–b in FIGS. 5A–C, from this file 600, they could use the browser menu bar to do so but it would be slow. They would have to select back button 412 four times to return them one level at a time in reverse serial order through their entire search back to the level 1 file. The process is time consuming. Alternately, if they selected the browser home key 414 they would return to their home page and lose the level 1 search results. Neither of these alternatives is acceptable. Both of these alternatives are cumbersome.

If the jumper product is utilized instead, the user has several options. As a first option, the user may select one of jumper buttons 312, 314, 316, 318 or 320 to return to respectively: a first, a previous, a random, a next, or a last of the hot-links shown in FIG. 6 in jumper drop-down list window 586. In response to user selection, the file corresponding to the selected hot-link will be retrieved and displayed in the browser window 406. As a second option, the user may select start timer button 322 to initiate the automatic and successive selection at a timed interval of every hot-link on the parsed list. In response to the automatic jump mode selection, each file corresponding to the selected hot-link will be retrieved and displayed by the browser for the timed interval. As a third option, the user may select drop-down window button 310 and select a given entry from the drop down list by clicking on it with a mouse. In response to their selection the file corresponding to the selected hot-link will be retrieved and displayed in the browser window 406. Alternately, another instance of browser can be opened to display the selected file. All of these choices enhance the search, and none require multiple reverse serial order steps to return to the level 1 hot-links.

Process Flow:

FIG. 7 shows the process connected with conducting a search utilizing a prior art browser. Commencing with start process 700, a connection process 702 results in Yahoo's™ home page 408 and query form being displayed in browser window 406, as shown in FIG. 4. Then in query process 704, the user enters a search topic, e.g., "Rat", in information indexer query field 410. In response to the entry of that search topic, the browser sends the query to server 34 of the search index provider, e.g., Yahoo™, the relevant topical identifiers and URLs are uploaded on an HTML encoded file/page and presented to the user in page receipt process 706. Subsequently, when a user utilizing a mouse selects one of the hot-links shown on that page, e.g., 502a–b, then that selection is detected in site access decision 708. The URL corresponding to the last selected hot-link is output over the Internet to access the file indicated by that URL and that file is uploaded and displayed in access process 710 to the user. Subsequently, in history creation process 712, that URL is added to a stack comprising in LIFO order the most recently accessed files, including the complete URL for those files. Control is then returned to back-one decision 714 which decision is also reached if a negative determination is made in site access decision 708. In back-one decision 714, a determination is made as to whether the user has selected back button 412 on the browser menu 402. If that selection has been made, then control is passed to repeat history process 716 in which the previous site visited is popped from the history stack and in access process 718 the browser accesses the site and file indicated by the prior URL and presents that in its view window to the user. Control is subsequently returned to site access decision 708.

Alternately, if in back-one decision 714 a negative determination is reached the browser awaits the next user command 720.

In FIGS. 8A–C the process connected with one embodiment of the current invention is shown. It contrasts with the prior art process, in that the user may return to the level of files pointed to by any level one hot-link immediately. The cumbersome process and many steps of reverse serial order traversal discussed above in FIG. 7, are not therefore necessary. FIG. 8A is an overall view of the process connected with either the single jump or automatic jump mode. FIG. 8B details the specific steps connected with the automatic jump mode. FIG. 8C details the specific steps connected with the single jump mode.

Commencing with FIG. 8A and start jumper process 800 control is passed to refresh decision 802. In the event, a determination is made that refresh/update button 326 shown in FIG. 3 has been selected, then control is passed to fetch and parse process 804 in which an HTML encoded page displayed in the browser view window is uploaded and parsed into an advertisement and hot-links. These are displayed in the jumper advertisement area 306 and the jumper drop-down window 586, respectively. Then in history decision 806, the determination is made as to whether the jumper history maintain option has been selected. This option is found under the edit portion of the menu bar 302. In the event that this option has been selected, then control is passed to append and store process 808 in which the hot-links extracted in fetch and parse process 804 are appended and stored with previous hot-links in the parsed HTML files in storage segment 230 shown on FIG. 2. Control is then passed to display URL process 812. Alternately, if a negative determination is made in history decision 806, then control is passed to store process 810 in which the hot-links from the fetch and parse process 804 replace any existing stored hot-links. Subsequent control also is passed to display URL process 812. In display URL process 812, the hot-links are displayed in the jumper drop-down window 586 as shown in FIG. 6. Control subsequently passes to display advertisement process 814 in which an image corresponding to an advertisement parsed from the browser page is placed in the jumper advertisement area 306.

As discussed above in connection with refresh decision 802, if a negative determination is made that the refresh button has not been pressed, then control passes also to display advertisement process 814 in which the advertisement from the page currently displayed on browser window 406 is uploaded and displayed in the jumper advertisement area 306. Control subsequently passes to start timer decision 816. If the user has selected start timer button 322 from the jumper menu bar, then automatic jump mode commences in a manner set forth in FIG. 8B. Alternately, if a negative determination is reached, then control is passed to jumper button select decision 818. A determination is made as to whether the user has selected any one of buttons 310–320 in the jumper window 300. In this event, control is passed to processes set forth on FIG. 8C and corresponding to single jump mode. The return from either the automatic jump or single jump process is via splice block B to jumper button select decision 818. Finally, when a negative determination is reached in jumper button select decision, control returns to refresh decision 802. This completes the overall processing connected with the jumpers tree traversal.

In FIG. 8B, the automatic jump mode of the search process is shown in greater detail. This process allows a user to view an animated tour of the level 2 files pointed to by the level 1 hot links in the browser window. Commencing with splice block A, control passes to memory fetch process 840 in which the first URL, of the hot-links in storage segment 230 shown in FIG. 2, is fetched by the jumper. In the next process, jumper-browser process 842 the first URL is sent to the browser, user I/O 208 caused the browser to access the specific site and file on the site, to upload the file and to display the file in the browser window 406. In one embodiment, if the browser is still loading a previous file when the jumper-browser process 842 is reached, then sending the browser the URL interrupts the loading of the previous file. In another embodiment, the jumper-browser process 842 does not interrupt the loading of the previous file. In a third embodiment, whether the jumper-browser process 842 interrupts the loading of the previous file is a user configurable option.

Control is then passed to delay process 844 in which a user selectable display interval causes the page image to be displayed on browser window 406 for the selected time interval. At the end of that time interval, control is passed to memory fetch process 846 in which the next URL in the parsed HTML file is uploaded and in last of list decision 848 a determination is made as to whether that URL is the last among the stored URLs. In the event that determination is in the negative, control returns to jumper-browser process 842 for the timed display of the next accessed URL. This loop from jumper-browser process 842 through last of list decision 848 constitutes a user configurable animation, in which a set of URLs which have been parsed and stored are now used to drive an automatic retrieval and display process.

Alternately, in last URL decision 848, if a determination is made in the affirmative, control is passed to "next" link decision, 850. In next link decision 850 a determination is made as to whether the last URL also includes a query for the next 10 entries corresponding to the example shown in FIG. 5C and indicated by 588. In the event that determination is in the affirmative, control is passed to jumper-browser-jumper process 852. In process 852 the query for the next 10 hot-links is sent to Yahoo™. In response the next HTML encoded page containing the 10 hot-links is retrieved. Control is passed to parse process 854 in which all the URLs and corresponding text identifiers are parsed along with the image corresponding to the advertisement. Then in buffer process 856, the parser output is stored for this session. Control then passes to memory fetch process 840 for automatic retrieval and display. Alternately, if in "next" link decision 850, a negative determination is made, then in jumper-browser process 858, the last URL is sent to the browser to both access and display the file corresponding to the last URL. Subsequently, control is passed to splice block B for a return to hot-link select decision 818.

The process corresponding to the single jump mode is shown in FIG. 8C. This process allows the user to select a specific level 1 hot-link and have the browser retrieve and display the level 2 file corresponding to the selected level 1 hot-link. In window process 880, the jumper drop-down window 586 is automatically opened, as is shown in FIG. 5C. Then in drop-down button process 882 a determination is made at to whether the button selected by the user and detected in jumper button select decision 818, was the drop-down list button 310. If the user did select button 310 then the user has not yet selected a specific hot-link from the parsed hot-links in the jumper drop-down window 586. Control is then passed to wait process 884. When the user selects a specific entry from the drop-down list control passes to locate select process 886. Alternately, if a negative determination is reached in jumper button select decision 818 then control is passed directly to locate select process 886. A negative determination in jumper select decision 818 means that one of jumper buttons 312, 314, 316, 318 or 320, was selected thereby indicating a specific user choice for the single jump location. These buttons were discussed above in connection with FIG. 3.

In locate select process 886 a determination is made as to which of the hot-links in the jumper drop-down window was selected. If, for example, first entry button 312 were selected then the first of the hot-links in the list is selected. Alternately, if the user selected drop-down window button 310 and then mouse selected an entry e.g. the fourth entry on the drop-down list, then that entry would be highlighted. In the example shown in FIG. 6 the user has selected hot-link 580 and that selection, the "Ricky Rock Rat" hot-link is detected by the jumper.

Subsequent to selection detection, control is passed to jumper-browser process 888. The URL corresponding to the selected hot-link is passed by the jumper to the browser causing the browser to locate and subsequently display a file corresponding to that URL. The jumper continues to display all level "1" sites as hot-links. In the next step highlight process 890 the selected hot-link is highlighted, as shown for example in FIG. 6 as highlight 602 around selected hot-link 580, "Ricky Rock Rat". After the highlight process, the selected hot-link on the drop-down list is copied to the jumper site window 308 in copy process 892. Subsequently, in process 894 the jumper drop-down window is closed.

When the browser displays the above mentioned file, the user may conduct a drill-down on the hot-links in that file in the browser window. In that case, the browser window is active and the jumper window is inactive. When the drill-down is complete and the user reactivates the jumper window by mouse clicking on it, that reactivation is detected in process 898 and control is passed to jumper select decision 818 via the splice block B, shown in FIG. 8A.

The following describes additional embodiments of the invention. Except where stated in alternative form, each of these embodiments include features that can be combined with the features discussed above.

Some alternative embodiments provide better integration of the jumpers functions and the browsers functions. In one embodiment of the invention, when a user initiates a search in the browser, the jumper automatically starts and begins parsing the results of the search. This saves the user from having to start the jumper separately from the browser. In another embodiment, the jumper functions are built directly into the browser. In a different embodiment, the jumper is implemented as an application, such as an applet, which is sent to the browser by the search engine. All of these embodiments provide a more integrated jumper/browser environment for the user.

Some alternative embodiments provide the user with more powerful tools for traversing the search results. In one embodiment, the categories in the search results are specially tagged (e.g., with a previously unused HTML tag) to indicate category fields as opposed to simple URLs. Alternatively, the categories can be parsed given their location in the search result (e.g., not indented). In an embodiment that includes category identification, the jumper includes functions for jumping from one category to the next category, in addition to being able to jump from one site identifier to the site identifier. As an enhancement to this embodiment, the user is presented with additional buttons for jumping from category to category. In another embodiment, the user can define how many site identifiers should be parsed from the search results. For example, if the search results provide twenty site identifiers, but the user may only want the first five identifiers, the user can specify that only the first five identifiers be provided. Similarly, in another embodiment, the user can specify what types of results should be parsed (e.g., only categories). Alternatively, in another embodiment, the jumper parses all the site identifiers, but the user specifies how many or what type to display.

In another embodiment, the user will be able to invoke the product from within their electronic e-mail box simply by double-clicking on attached files. These files may be encoded in markup language. In another embodiment, the HTML parsed files for both transmission and receipt by users would be able to be compressed and decompressed by users with simple click commands common to normal software operations. In another embodiment, the product will not require an additional instance of the presenter to be invoked upon return to the original home page. In still another embodiment of the product, the list box will contain a drag and drop user interface which will allow the user to cut and paste URLs from one list to another and compile their own individual lists to their preferred selection and taste. In still one more embodiment of the product, the user will be able to adjust and modify the overall interface of various URLs, hot-links and other files viewable within the presenter to both highlight the various objects mentioned previously for marking the users place in the list that they are working from, and similarly be able to change the nature of the highlight of such previously mentioned item to be noted as important by a permanent highlighting of the particular object.

Thus, a method and apparatus for retrieving information has been described. Note that though the foregoing has particular utility and has been described with reference to certain specific embodiments in the figures and the text, that one may practice the present invention without implementing all of these specific details. Thus, the figures and the text are to be viewed in an illustrative sense only, and not limit the present invention. The present invention is only to be limited by the appended claims which follow.

DEFINITIONS

1. NETWORK: A network is a hard drive, a local network, a wide area network, an intranet, the internet or any series or combination of computers or computing hardware.

2. FILE: A file is a collection of data that may be coded or unencoded. Coded files may contain the HTML, SGML or other mark up language. Unencoded files comprise; audio, visual, graphics, and/or video. Files may be encrypted or unencrypted during transmission. An electronic mail message is also considered to be a file. In addition, attachments to electronic mail are also considered files.

3. PRESENTER: A presenter is an interactive information media either visual or audio, animated or static, graphical or textual, audio or silent.

4. SITE IDENTIFIER: A site identifier is a pointer to a file.

What is claimed is:

1. A computer implemented method of retrieving information from a network comprising:

receiving a first file of information which includes at least site identifiers;

parsing said first file of information to extract a list of site identifiers storing the list of site identifiers;

automatically sending a plurality of jump commands to the browser separated by a selectable delay period wherein each of said jump commands includes a one of said site identifiers from said list comprising site identifiers, and wherein further responsive to said plurality of jump commands a site corresponding to each of said site identifiers is accessed.

2. The computer implemented method of claim 1 wherein said step of automatically sending further comprises;

retrieving a file from each of said accessed sites corresponding to each of said site identifiers.

3. The computer implemented method of claim 2 wherein said step of automatically sending further comprises;

displaying each of said retrieved files.

4. The computer implemented method of claim 1 wherein:

said first file comprises information in a markup language; and said site identifiers comprise URLs.

5. The computer implemented method of claim 3 wherein:

said first file comprises information in a markup language; and said site identifiers comprise URLs.

6. A computer usable medium having computer readable program code means embodied therein for causing a retrieval of information from the computer readable program code means in said article of manufacture comprising:

computer readable program code means for causing a computer to receive a first file of information which includes site identifiers and other information;

computer readable program code means for causing a computer to parse said first file of information to extract a list comprising site identifiers;

computer readable program code means for causing a computer to automatically send a plurality of jump commands separated by a delay period wherein each of said jump commands includes a one of said site identifiers from said list comprising site identifiers, and wherein further responsive to said plurality of jump commands, a site corresponding to each of said site identifiers is accessed.

7. The computer readable program code means in said article of manufacture of claim 6 comprising:

computer readable program code means for causing a computer responsive to said automatically sending a plurality of jump commands to retrieve a file from each of said accessed sites corresponding to each of said site identifiers.

8. The computer readable program code means in said article of manufacture of claim 7 comprising:

computer readable program code means for causing a computer responsive to said automatically sending a plurality of jump commands, to display each of said retrieved files.

9. The computer readable program code means in said article of manufacture of claim 6 comprising:

computer readable program code means for causing a computer to receive said first file of information, wherein said first file, comprises information in a markup language and said site identifiers comprise URLs.

10. The computer readable program code means in said article of manufacture of claim 8 comprising:

computer readable program code means for causing a computer to receive said first file of information, wherein said first file, comprises information in a markup language and said site identifiers comprise URLs.

* * * * *